Sept. 8, 1959 L. GOLDSTEIN ET AL 2,903,652

ULTRA-HIGH FREQUENCY AMPLITUDE MODULATOR

Filed March 11, 1952 2 Sheets-Sheet 1

INVENTORS
LADISLAS GOLDSTEIN
PATRICK E. DORNEY
MURRAY A. LAMPERT

BY [signature]
ATTORNEY

Sept. 8, 1959 L. GOLDSTEIN ET AL 2,903,652

ULTRA-HIGH FREQUENCY AMPLITUDE MODULATOR

Filed March 11, 1952 2 Sheets-Sheet 2

INVENTORS
LADISLAS GOLDSTEIN
PATRICK E. DORNEY
MURRAY A. LAMPERT
BY Percy P. Lantzy
ATTORNEY United States Patent Office 2,903,652
Patented Sept. 8, 1959

2,903,652

ULTRA-HIGH FREQUENCY AMPLITUDE MODULATOR

Ladislas Goldstein, Urbana, Ill., Patrick E. Dorney, West Englewood, N.J., and Murray A. Lampert, New York, N.Y., assignors to International Telephone and Telegraph Corporation, a corporation of Maryland Application March 11, 1952, Serial No. 276,012

5 Claims. (Cl. 332—57)

This invention relates to ultra-high frequency amplitude modulators and more particularly to amplitude modulators utilizing electronically controlled gas discharge devices.

The modulation of the amplitude of microwave signals is desirable in many applications. To obtain such modulation of the output of a microwave oscillator, such as a magnetron or klystron, is difficult because the geometry of these tubes is usually such as to make it very expensive to build a modulating device into the tube. Furthermore, the internal amplitude modulation of microwave sources is usually accompanied by undesirable effects, such as frequency pulling or pushing or mode jumping. On the other hand, attempts to amplitude modulate the signal outside the source, that is by a device coupled to the oscillator or mounted in the transmission line coupling the signal source to its load, have not heretofore been proven too successful. Such attempts have in the past been limited to very low modulating frequencies (substantially those obtained with mechanical devices) or the modulation of only low power signals. In addition, such modulation devices heretofore known have usually had unfavorable reactions on the signal source.

One of the objects of this invention, therefore, is to provide an ultra-high frequency amplitude modulating device which overcomes the aforementioned objections.

Another object of this invention is to provide a device capable of amplitude modulating microwave signals of a high power level at a high modulation frequency rate.

A further object of this invention is to provide an ultra-high frequency modulating device which will have substantially little effect on the microwave signal source.

A feature of this invention utilizes a hybrid T waveguide junction, such as a Magic Tee, to divide the input signal energy into two signals of substantially equal amplitude. Each of these signals is propagated through a branch of a common energy transmission system. An electron gaseous medium contained in one or both branches has the electron density thereof varied in response to one or more sources of modulated signals so that the divided input signals propagated without reflections through the electron gaseous medium have their relative phase relationships varied. An output hybrid Tee waveguide junction, such as a Magic Tee, is utilized to combine the divided signals so that the output to the load from one arm of the output junction varies according to the change in relative phase of the signals fed to the output junction.

Another feature of this invention utilizes a gas discharge device in each branch of a parallel waveguide system to detune a resonant section of waveguide in the branch and thereby vary the shunt susceptance of the branch. The power reflected back to the input hybrid Tee junction from one resonant section arrives 180° out of phase with that arriving from the other section due to the location of the resonant sections, and this reflected energy is cancelled across the input arm of the input junction but is propagated in another arm coupled to dissipative means.

The above-mentioned and other features and objects of this invention will become more apparent by reference to the following description taken in conjunction with the accompanying drawings, in which.

Figure 1:
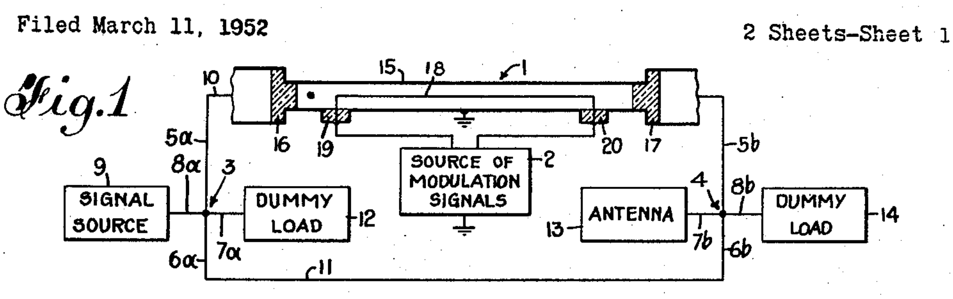
Fig. 1 is a schematic circuit diagram partly in block form of one embodiment of this invention.
Figure 2:
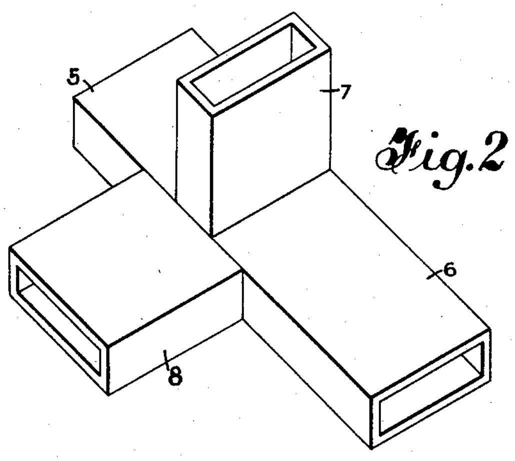
Fig. 2 is a perspective view of one form of hybrid Tee waveguide junction that may be used in this invention.

Referring to Fig. 1 of the drawing, the amplitude modulating circuit therein shown is controlled by an electronically variable phase shift tube 1 which is responsive to a source of modulation signals 2 and includes an input hybrid Tee junction 3 and an output hybrid Tee junction 4. Each hybrid Tee junction as illustrated in Fig. 2 comprises two side arms 5 and 6, a series arm 7, and a shunt arm 8. Again referring to Fig. 1, the R.-F. signal to be modulated from source 9 is coupled to the shunt arm **8*a* of the input hybrid junction 3 which divides the input signal into two signals of equal amplitude. The two equal signal outputs from side arms 5*a* and 6*a* are coupled to two equal lengths of waveguide structure 10 and 11. A dummy load 12 may be coupled to series arm 7*a* to absorb any R.-F. losses, such as may be reflected back to junction 3. Waveguide 10 contains phase shift tube 1 through which a D.-C. discharge is maintained by means of a variable D.-C. voltage source 2. The D.-C. voltage from source 2 is varied in accordance with the modulation desired and thus varies the electron density of the gas discharge in the phase shift tube 1. The R.-F. signal propagated through waveguide 10 and the phase shift tube 1 is coupled to side arm 5*b* of the output hybrid Tee junction 4. The R.-F. signal propagated through waveguide structure 11 is coupled to side arm 6*b* of the output hybrid Tee junction 4**.

If the waveguide structures 10 and 11 are of the same length, the signals propagated through each structure arrive at the output hybrid Tee junction 4 with the same phase and amplitude. The net voltage output across series arm **7*b* of junction 4 will then be zero, and the total power output is sent into shunt arm 8*b* of output junction 4. If the phase shift tube 1 produces a 180° phase shift of the signal propagated through waveguide 10, the two R.-F. signals arriving at the side arms 5*b* and 6*b* of the output junction 4 will be of opposite phase, and all the power will be sent into series arm 7*b*. For phase shifts between 0 and 180°, the power will divide in varying amounts between the series arm 7*b* and the shunt arm 8*b* of output junction 4, an antenna 13 or other suitable termination is coupled to the shunt arm 8*b*, and a device 14 capable of dissipating the rejected power is coupled to the series arm 7*b***. The circuit of Fig. 1 then serves as an adequate amplitude modulator for ultra-high frequency signals.

The phase shift tube 1 comprises a section of waveguide 15 which is sealed at each end by walls 16 and 17 composed of an appropriate material such as glass.

An ionizable medium is introduced into the sealed off portion of waveguide 15. Electrode 18 is coupled to the source of modulation signals 2 and insulated from waveguide 15 by insulation means 19 and 20. The medium contained in waveguide section 15 is ionized, producing a dense electron gaseous medium when a voltage is applied between electrode 18 and the waveguide 15. The phase velocity of the high frequency signal propagated through waveguide 15 is varied responsive to the density of the electron gaseous medium which is controlled by the source of modulation signals 2. The gas discharge plasma represents a dielectric whose dielectric constant differs from unity by an amount dependent upon the electron density of the gas plasma in the phase shift tube 1 and the frequency of signal propagated through transmission line 10. For any given frequency the electron density may be varied by varying the current through the gas, thereby changing the dielectric constant of the plasma thus varying the phase velocity of the high frequency signal propagated through the gas plasma. Since the current through the gas is varied in response to the source of modulation signals 2, the phase velocity of the signal propagated through waveguide 10 is responsive to the source of modulation signals 2.

The amount of phase shift of the R.-F. signal propagated through the waveguide 10 in the $TE_{1,0}$ mode is dependent upon the electron density, the location of the plasma electrons in waveguide 10, and the length of plasma through which the signal is propagated. The greater the length of plasma, the greater the phase shift. A larger phase shift is also obtained if the electrons exist in a region of the waveguide 10 where the electric field vector of the R.-F. signals propagated through the waveguide is greatest, i.e. the central region. In addition, gases with low ionization potentials will provide such electron densities at low power levels as is necessary for relatively large phase shift. Gases with high ionization potentials produce smaller phase shifts for equal power input to the phase shift tube 1. The heavier the mass of the gass, then the larger the phase shift for equal power input to the gas discharge device. With this circuit, no modulation of the signal corresponds to no discharge (zero electron density) in the phase shift tube.

Figure 3:
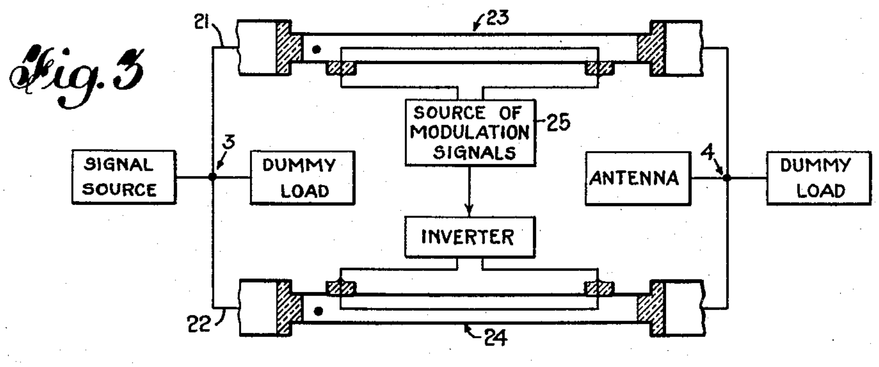
Fig. 3 is a schematic circuit diagram partly in block form of another embodiment of this invention.

In the circuit of Fig. 3, an amplitude modulating circuit similar to the circuit of Fig. 1 is shown wherein a phase shift tube is located in the transmission waveguides 21 and 22 at 23 and 24, respectively, so that the phase velocity of both halves of the divided input signal is varied. The electron density in each phase shift tube 23 and 24 is varied, one increasing and the other decreasing, in response to the source of modulation signals 25 so that the phase velocity of the R.-F. signals propagated through each phase shift tube, 23 and 24, is of equal magnitude but of opposite direction to that produced by the other tube. The total relative phase shift of the signals arriving at output junction 4 is the sum of the phase shift produced in each phase shift tube 23 and 24. Thus by utilizing a phase shift tube in each waveguide 21 and 22, the amount of the phase shift required of each tube is reduced, reducing the electron density requirements of each tube without altering the absorption characteristics. With this circuit, no modulation of the signal corresponds to finite (non-zero), equal, electron densities in the two phase shift tubes.

Figure 4:
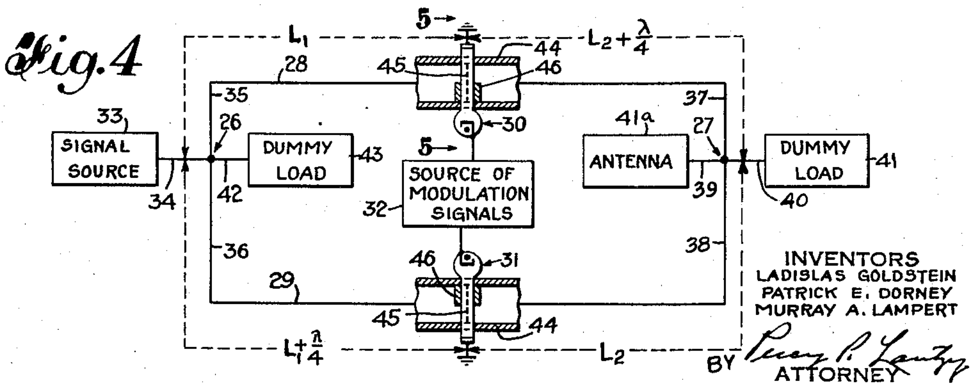
Fig. 4 is a schematic circuit diagram partly in block form of an embodiment of this invention utilizing a gas discharge device to vary the shunt susceptance of the transmission system.

Referring to Fig. 4 of the drawing, an amplitude modulating circuit according to the principles of this invention is shown comprising an input hybrid Tee junction 26 and an output hybrid Tee junction 27 coupled by two sections of waveguide 28 and 29 each containing a gas discharge device 30 and 31 within a resonant section controlled by a source of modulation signals 32.

Figure 5:
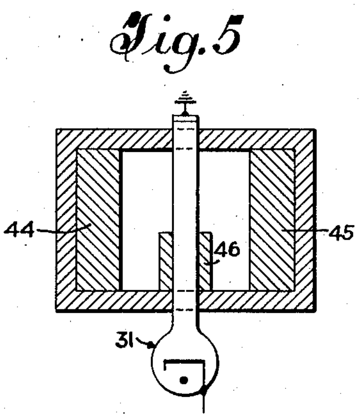
Fig. 5 is a cross-sectional view of the variable reactance section taken along the lines 5—5 of Fig. 4.

The input R.-F. signal to be modulated, from signal source 33, is coupled to the shunt arm 34 of the input hybrid Tee junction 26 and divides equally between side arms 35 and 36 of the input junction 26. The gas discharge tubes 30 and 31 are arranged in parallel transmission waveguides 28 and 29 so that when a gas discharge is created in tubes 30 and 31, it detunes the resonant sections of the transmission waveguides and varies the shunt susceptance of the transmission system in accordance with the electron density of the gas discharge. Each resonant section, as shown in Fig. 5, comprises two inductive irises 44 and 45 and a hollow capacitive post 46. A gas discharge tube is inserted in the resonant section through capacitive post 46. For further information of resonant gas sections of the type shown in Figs. 4 and 5, reference may be had to the copending application of L. Goldstein, D. J. Levine, and W. Sichak, Serial No. 272,-236, filed February 18, 1952, now Patent No. 2,745,072. The transmission waveguides 28 and 29 are of equal electrical length so that if the tubes 30 and 31 are matched, the divided signals arrive at side arms 37 and 38 of the output hybrid Tee junction 27 in phase. The signals would then add across shunt arm 39 and cancel across series arm 40 of the output junction 27, and all the power is coupled to antenna 41*a* which is connected to the shunt arm 39. A dummy load 41 is coupled to series arm 40 to dissipate any R.-F. energy losses. If the gas discharge across tubes 30 and 31 detunes the resonant sections so that a large shunt susceptance is introduced into the transmission system, substantially all the power will be reflected back to the hybrid Tee junction 26. The electrical distances between the input junction 26 and the tube 31 is one-quarter wavelength greater than the distance to tube 30. The power reflected back to the input junction 26 when the tubes 30 and 31 are detuned will be 180° out of phase because of the quarter wavelength difference between the input junction and the resonant sections, and all the reflected power will be sent into series arm 42 of the input hybrid junction 26. A dummy load 43 is coupled to series arm 42 to dissipate this unwanted reflected power. When the gas discharge within tubes 30 and 31 detune the resonant sections to introduce smaller amounts of shunt susceptance, part of the power input will be transmitted to antenna 41*a* and the remainder will be reflected to dummy load 43 as heretofore explained. At all times the signal source 33 will see a matched load.

Figure 6:
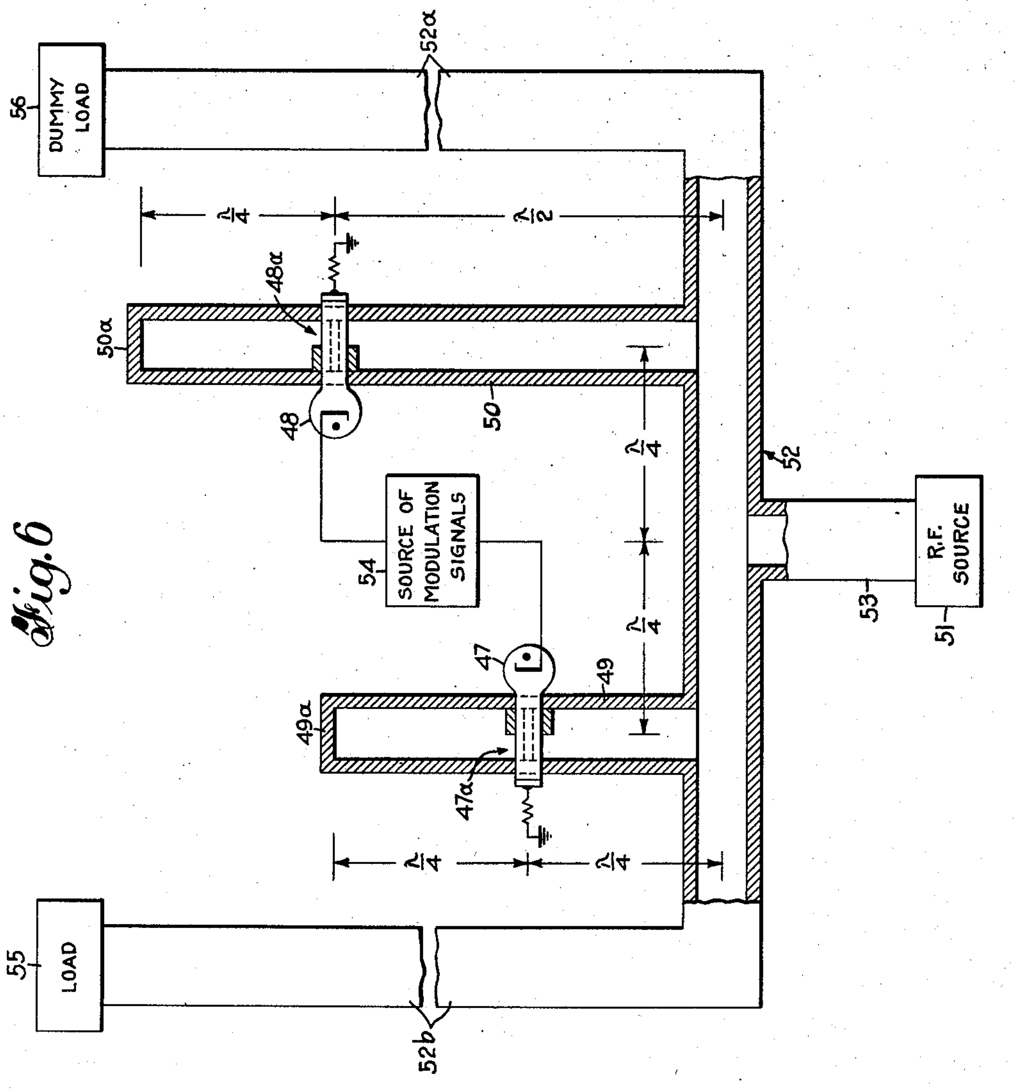
Fig. 6 is a cross-sectional view partly in block form of a fourth embodiment of this invention utilizing electronically controlled gas discharge devices to amplitude modulate R.-F. energy.

Referring to Fig. 6, an electronically controlled amplitude modulating device according to the principles of this invention is shown wherein gas discharge devices 47 and 48, similar to the device shown in Fig. 5, are each located in a resonant section 47*a* and 48*a* of waveguide stubs 49 and 50, respectively. Varying the electron density in the gas discharge contained in devices 47 and 48 detunes resonant structures 47*a* and 48*a* which alters the effective impedance of waveguide stubs 49 and 50. It is to be understood that the tunable elements 47*a* and 48*a* may take the form of Hi-Q cavities, dissipative structures instead of reactive or a combination of both. A signal source 51 is coupled to an energy transmission line 52 having two branches 52*a* and 52*b* by a section of waveguide 53. Waveguide stubs 49 and 50 are located a quarter wavelength or odd multiple thereof on either side of the junction of waveguide section 53 with the main transmission line 52. The resonant section 47*a* is located in waveguide stub 49 a quarter wavelength from the junction of stub 49 with the main transmission line 52 and a quarter wavelength from the shorted end 49*a* of waveguide stub 49. The resonant section 48*a* is located in waveguide stub 50 a half wavelength from the junction with the main transmission line 52 and a quarter wavelength from the shorted end 50*a* of waveguide stub 50. The electron density of the gas discharge in devices 47 and 48 are responsive to a source of modulation signals 54. Varying the electron density of devices 47 and 48 detunes the resonant sections 47*a* and 48*a* which varies the impedance seen at a fixed position in the waveguide and is the equivalent of varying the position of a short in the waveguide stub.

When the electron density of gas discharge device 47 is such that it substantially detunes the resonant section *47a*, the effective electrical length of waveguide stub 49 is equal to a quarter wavelength, and the input signal from source 51 sees a short across arm 49 leading to the load 55. When the modulation signals from source 54 varies the electron density of device 47 to detune resonant section *47a*, the signals simultaneously control the electron density of device 48 to detune resonant section *48a* so that the effective electrical length of waveguide stub 50 is equal to a half wavelength, and all the power from R.-F. source 51 is coupled to dummy load 56 where it is dissipated. If the modulation signals from source 54 do not cause the resonant sections *47a* and *48a* to be detuned, the effective electrical length of waveguide stub 49 is equal to a half wavelength, and the effective electrical length of waveguide stub 50 is three quarters of a wavelength, and all the power from source 51 will be coupled to load 55. For intermediate densities of the gas discharge in devices 47 and 48, as controlled by source 54, the power from source 51 will divide between load 55 and dummy load 56. Thus the device will effectively amplitude modulate the R.-F. energy from source 48 responsive to the source of modulation signals 54.

Under all conditions a matched load will be presented to the R.-F. energy source 51 and the power division is accomplished without any inherent losses of power other than the dissipative losses of the energy transmission system.

While we have described above the principles of our invention in connection with specific apparatus, it is to be clearly understood that this description is made only by way of example and not as a limitation to the scope of our invention as set forth in the objects thereof and in the accompanying claims.

We claim:

1. An amplitude modulating device comprising a constant input resistance radio-frequency energy transmission system including an input junction, a pair of output terminals, and a pair of parallel waveguide branches each joining said input junction and a separate one of said output terminals, a pair of series waveguide branches each in series in each parallel branch and each containing an electron gaseous medium, a source of modulation signals, means to vary simultaneously the electron density of the gaseous mediums of each of said series branches responsive to said modulation signals to thereby change the propagation characteristics of the parallel branches and the relative proportions of the input radio-frequency energy transmitted to each output terminal, whereby the energy at each terminal is amplitude modulated.

2. An amplitude modulating device according to claim 1, further including a dummy load connected to one of the output terminals, a utilization circuit being connected to the other one thereof.

3. A device according to claim 1, wherein the electron gaseous medium is contained within a resonant section of each of said series waveguide branches, one of said sections being effectively substantially a quarter wavelength longer than the other.

4. A device according to claim 1, wherein the electron gaseous medium is contained within a resonant section of each of said series waveguide branches, the distance from one of said resonant sections to said input junction being a quarter wavelength greater than the distance from said input junction to the resonant section in the other branch.

5. A device according to claim 1, wherein the electron gaseous medium is contained within a resonant section of each of said series waveguide branches, each said section having a plurality of inductive irises transverse to the direction of radio-frequency energy propagated through said waveguide, a hollow capacitive post, and a gas discharge tube, containing an ionizable medium, transverse to said resonant section whereby the varying electron density of the gas discharge within each said tube detunes said resonant structure.

References Cited in the file of this patent

UNITED STATES PATENTS

| | | |
|---|---|---|
| 2,408,425 | Jenks et al. | Oct. 1, 1946 |
| 2,413,963 | Fiske | Jan. 7, 1947 |
| 2,415,242 | Hershberger | Feb. 4, 1947 |
| 2,447,543 | Smullin | Aug. 24, 1948 |
| 2,532,157 | Evans | Nov. 28, 1950 |
| 2,557,961 | Goldstein | June 26, 1951 |
| 2,593,120 | Dicke | Apr. 15, 1952 |
| 2,605,356 | Ragen | July 29, 1952 |
| 2,614,246 | Dome | Oct. 14, 1952 |
| 2,707,269 | Altar et al. | Apr. 26, 1955 |